United States Patent
Nestico et al.

(10) Patent No.: US 8,364,340 B2
(45) Date of Patent: Jan. 29, 2013

(54) METHOD AND SYSTEMS FOR VIRTUAL SENSOR SELECTION AND BLENDING

(75) Inventors: Brian Francis Nestico, Mason, OH (US); Sridhar Adibhatla, Glendale, OH (US); David Allen Gutz, Danvers, MA (US); Daniel Edgardo Viassolo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1125 days.

(21) Appl. No.: 12/415,487

(22) Filed: Mar. 31, 2009

(65) Prior Publication Data

US 2010/0250051 A1   Sep. 30, 2010

(51) Int. Cl.
*G01M 17/00* (2006.01)
*G06F 7/00* (2006.01)
*G06F 19/00* (2011.01)

(52) U.S. Cl. .................................................. 701/33.1
(58) Field of Classification Search ............... 244/53 R, 244/75.1, 171.5; 702/58, 104, 116, 183, 702/185, 189; 324/383, 384, 500, 503, 512; 703/2, 6, 7, 8; 701/33, 34
See application file for complete search history.

(56) References Cited

U.S. PATENT DOCUMENTS

| | | | |
|---|---|---|---|
| 4,258,545 A | 3/1981 | Slater | |
| 5,044,155 A | 9/1991 | Zimmerman | |
| 5,136,841 A | 8/1992 | Zimmerman | |
| 6,282,884 B1 | 9/2001 | Adibhatla et al. | |
| 6,415,276 B1 * | 7/2002 | Heger et al. | 706/52 |
| 6,688,097 B2 | 2/2004 | Chapman et al. | |
| 6,745,089 B2 * | 6/2004 | Rasmussen et al. | 700/51 |
| 6,999,906 B2 * | 2/2006 | Koehler et al. | 702/193 |
| 7,020,595 B1 | 3/2006 | Adibhatla et al. | |
| 7,043,899 B2 * | 5/2006 | Wang et al. | 60/277 |
| 7,415,328 B2 * | 8/2008 | Volponi | 701/9 |
| 7,778,943 B2 * | 8/2010 | Guralnik et al. | 706/12 |
| 7,890,296 B2 * | 2/2011 | Brown | 702/182 |
| 2003/0060939 A1 * | 3/2003 | Jones et al. | 701/3 |
| 2004/0030417 A1 * | 2/2004 | Gribble et al. | 700/29 |
| 2005/0027494 A1 * | 2/2005 | Erdogmus et al. | 703/2 |
| 2006/0142976 A1 * | 6/2006 | Bonanni et al. | 702/189 |
| 2006/0212281 A1 * | 9/2006 | Mathews et al. | 703/7 |
| 2008/0177505 A1 * | 7/2008 | Volponi | 702/185 |
| 2008/0221835 A1 * | 9/2008 | Volponi | 702/185 |

* cited by examiner

*Primary Examiner* — Khoi Tran
*Assistant Examiner* — Nicholas Kiswanto
(74) *Attorney, Agent, or Firm* — General Electric Company; Matthew P. Hayden; David J. Clement

(57) ABSTRACT

A method and systems for engine control of a vehicle propulsion system are provided. The system includes a plurality of engine model modules executing independently and programmed to receive engine operating condition values from a plurality of sensors positioned on an engine wherein each of the plurality of engine model modules is programmed to determine an estimate of a process parameter of a location in the engine where a sensor is not available, not present at the location, has failed, or is determined to be inaccurate. The system also includes an estimate source selector configured to determine model blending factors and a model blending module configured to determine an estimated virtual sensor value using the determined estimates from at least two of the plurality of engine model modules and the model blending factors.

20 Claims, 9 Drawing Sheets

METHOD AND SYSTEMS FOR VIRTUAL SENSOR SELECTION AND BLENDING

STATEMENT REGARDING FEDERALLY SPONSORED RESEARCH & DEVELOPMENT

The U.S. Government has certain rights in this invention as provided for by the terms of Contract No. N00019-04-C-0093.

BACKGROUND OF THE INVENTION

This invention relates generally to gas turbine engines and, more particularly, to determining operating parameters for controlling gas turbine engines.

In at least some known rotatable machines for example, a gas turbine engine, turbine blade and/or nozzle temperatures have to be limited to ensure safe operation of the gas turbine engine and to ensure desired life for engine components. However, because of the adverse environments where these components operate, the temperatures are not measurable using thermocouples or RTDs, the traditional techniques for measuring gas path temperatures.

One known technique used on current production engines involves measuring exhaust gas temperature (EGT) downstream of the high-pressure turbine components at a location cool enough for a temperature probe to survive. This technique is prone to sampling problems, thermal lags in the probes, and errors in correlating the measured gas temperature to the desired metal temperature upstream. Moreover, as gas-path temperatures increase, probe life is reduced and cost increases. A second measurement technique uses a pyrometer to measure the metal temperature of interest. This technique is expensive and is subject to problems with line of sight, lens fogging, and sensing system unreliability.

Aircraft engines are designed to provide specified levels of thrust, but thrust cannot be measured. Hence, thrust is inferred from a measurable thrust-setting parameter such as fan speed or engine pressure ratio. In certain applications, such as in aircraft capable of short takeoff and vertical landing, it is highly desirable to control thrust directly, rather than through the control of speed or pressure ratio. This requires that the engine's control system have a means for estimating thrust accurately.

BRIEF DESCRIPTION OF THE INVENTION

In one embodiment, a system includes a plurality of engine model modules executing independently and programmed to receive engine operating condition values from a plurality of sensors positioned on an engine wherein each of the plurality of engine model modules is programmed to determine an estimate of a process parameter of a location in the engine where a sensor is not available, not present at the location, has failed, or is determined to be inaccurate. The system also includes an estimate source selector configured to determine model blending factors and a model blending module configured to determine an estimated virtual sensor value using the determined estimates from at least two of the plurality of engine model modules and the model blending factors.

In another embodiment, a method of controlling the operation of an engine of a vehicle includes receiving data from a plurality of sensors associated with corresponding sensed locations on the engine and determining by each of a plurality of engine model modules configured to simulate an operation of the engine, an estimate of a process parameter of a location in the engine where at least one of a sensor for the process parameter is not available, a sensor for the process parameter is not present at the location, a sensor at the location has failed, and a sensor at the location is determined to be inaccurate. The method also includes determining model blending factors using an estimate source selector, determining an estimated virtual sensor value using the determined estimates from at least two of the plurality of engine model modules and the model blending factors, and controlling the operation of the engine using the estimated virtual sensor value.

In yet another embodiment, a system for controlling the operation of a vehicle engine includes a plurality of sensors configured to output a sensed vehicle parameter value and an engine controller that includes a plurality of engine model modules including at least one of a physics model, a regression model, and a look-up table model. The plurality of engine model modules are configured to execute independently and are programmed to receive engine operating condition values from the plurality of sensors. Each of the plurality of engine model modules is programmed to determine an estimate of a process parameter of a location in the engine where at least one of a sensor for the process parameter is not present at the location and a sensor at the location has failed. The plurality of engine model modules are further configured to generate at least one of a model accuracy level and a model validity level wherein the model accuracy level represents a measure of the accuracy of the determined estimate based on a predetermined assessment of the inputs to the respective model and the model validity level represents a measure of the validity of the model based on a predetermined assessment of the inputs to the respective model. The system further includes a model verifier configured to apply at least one of a range check, a rate check, a drift check, a noise detection, and a prediction on the determined estimates from each of the engine model modules to generate a verification result for the determined estimates of the process parameter from each of the engine model modules wherein the verification result represents a measure of a validity of the determined estimates of the process parameter from each of the engine model modules. The system also includes an estimate source selector communicatively coupled to the plurality of engine model modules and the model verifier, the estimate source selector configured to determine model blending factors using the model self-confidence levels and results of the reasonableness checks and a model blending module configured to determine an estimated virtual sensor value using the determined estimates from at least two of the plurality of engine model modules and the model blending factors.

BRIEF DESCRIPTION OF THE DRAWINGS

FIG. 1 is a schematic illustration of an exemplary gas turbine engine having a longitudinal centerline;

FIG. 2 is a schematic block diagram of a model-based engine control system in accordance with an exemplary embodiment of the present invention;

FIG. 3 is a data flow diagram of a model selection and blending architecture that may be used with the model-based engine control system shown in FIG. 2;

FIG. 4 is a flow diagram of an exemplary method of controlling the operation of an engine of a vehicle;

FIG. 5 is a graph of the validity level of the engine model modules shown in FIG. 2 in accordance with an exemplary embodiment of the present invention;

FIG. 6 is a graph of the mode scheduling of the engine model modules shown in FIG. 2 in accordance with an exemplary embodiment of the present invention;

FIG. 7 is a graph of the model accuracy self-confidence of the engine model modules shown in FIG. 2 in accordance with an exemplary embodiment of the present invention;

FIG. 8 is a graph of a trace of a confidence level of a regression model within the model shown in FIG. 2 in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of determining operating parameters of equipment using sensors at locations remote from the location of interest in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
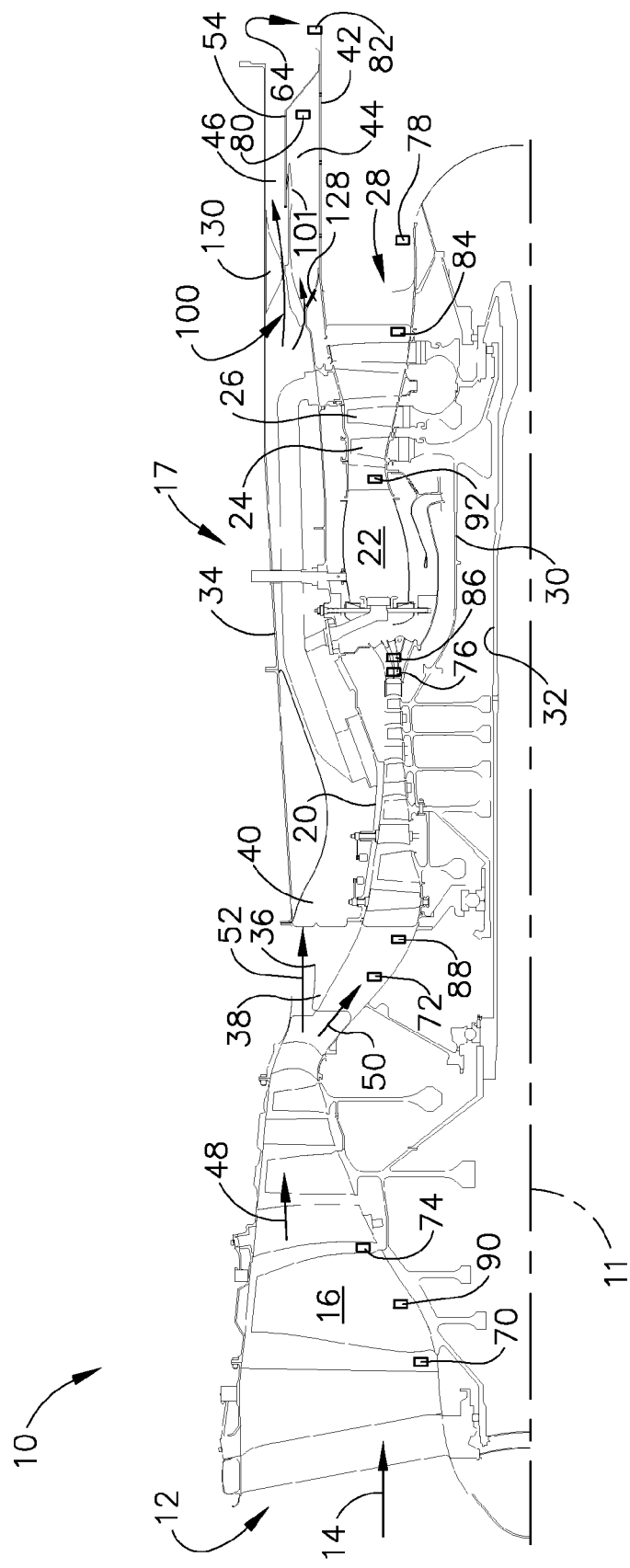
FIGS. 1-9 show exemplary embodiments of the method and systems described herein.

FIG. 1 is a schematic illustration of an exemplary gas turbine engine assembly 10 having a longitudinal centerline 11. Gas turbine engine assembly 10 includes an annular inlet 12 for receiving ambient air 14 followed in axial flow relationship by a fan assembly 16, a core gas turbine engine 17 that includes a high-pressure compressor (HPC) 20, a combustor 22, and a high-pressure turbine (HPT) 24, a low pressure turbine (LPT) 26 and an augmentor 28. HPT 24 powers HPC 20 through a first shaft 30. LPT 26 powers fan assembly 16 by a second shaft 32. Gas turbine engine assembly 10 further includes an outer casing 34 which is spaced from an inner casing 36 including a forward section 38 of inner casing 36 defining a bypass duct 40. In the exemplary embodiment, augmentor 28 includes a diffuser liner 42.

In the exemplary embodiment, gas turbine engine assembly 10 also includes a valve assembly 100 that is coupled within bypass duct 40. More specifically, valve assembly 100 is positioned to facilitate separating bypass duct 40 into a radially inner bypass duct 44 and a radially outer bypass duct 46. More specifically, in the exemplary embodiment, inner bypass duct 44 and outer bypass duct 46 are aligned substantially concentrically. Accordingly, and in the exemplary embodiment, fan bypass flow 48 entering bypass duct 40 is divided into an inner bypass flow 50 and an outer bypass flow 52. Moreover, in the exemplary embodiment, valve assembly 100 facilitates regulating the volume of inner bypass flow 50 that is channeled through inner bypass duct 44 and the volume of outer bypass flow 52 that is channeled through outer bypass duct 46.

In the exemplary embodiment, a separation liner 54 contacts a tail portion 101 of valve assembly 100 and is coupled to diffuser liner 42 to facilitate channeling inner bypass flow 50 through inner bypass duct 44. Furthermore, separation liner 54 also facilitates channeling outer bypass flow 52 through outer bypass duct 46.

During operation, air entering gas turbine engine assembly 10 through inlet 12 is compressed by fan assembly 16. The flow of compressed air exiting fan assembly 16 is split such that inner bypass flow 50 is channeled into core gas turbine engine 17 and outer bypass flow 52 is channeled through bypass duct 40. Inner bypass flow 50 is further compressed by high-pressure compressor 20 and is channeled to combustor 22. Airflow discharged from combustor 22 drives rotating turbines 24 and 26 prior to being discharged from gas turbine engine assembly 10 through an exhaust 64.

In the exemplary embodiment, gas turbine engine assembly 10 includes a plurality of sensors, which monitor engine operation and input real-time actual engine sensor data during engine operation to engine model (not shown in FIG. 1). In one embodiment, the sensors monitor engine rotor speeds, engine temperatures, and engine pressures. Ambient flight condition data is also input to the engine model. Ambient flight condition data input includes, but is not limited to, ambient temperature, ambient pressure, aircraft mach number, and engine power setting parameters such as fan speed or engine pressure ratio. Exemplary sensor locations include but are not limited to a fan inlet temperature sensor 70, a compressor inlet total pressure sensor 72, a fan discharge static pressure sensor 74, a compressor discharge static pressure sensor 76, an exhaust duct static pressure sensor 78, an exhaust liner static pressure sensor 80, a flame detector 82, an exhaust gas temperature sensor 84, a compressor discharge temperature sensor 86, a compressor inlet temperature sensor 88, a fan speed sensor 90, and a core speed sensor 92.

In the exemplary embodiment, gas turbine engine assembly 10 is a military jet engine such as a F110. In other embodiments, gas turbine engine assembly 10 may be other military engines of a commercial engine such as for example, but not limited to a CFM56 gas turbine engine or a CF34-10 gas turbine engine that are each commercially available from General Electric Company, Cincinnati, Ohio. It should be appreciated that in other embodiments, gas turbine engine assembly 10 may be any gas turbine engine containing similar components, such as the F136 engine or a marine/industrial engine such as the LM6000, also available from the General Electric Company.

Figure 2:
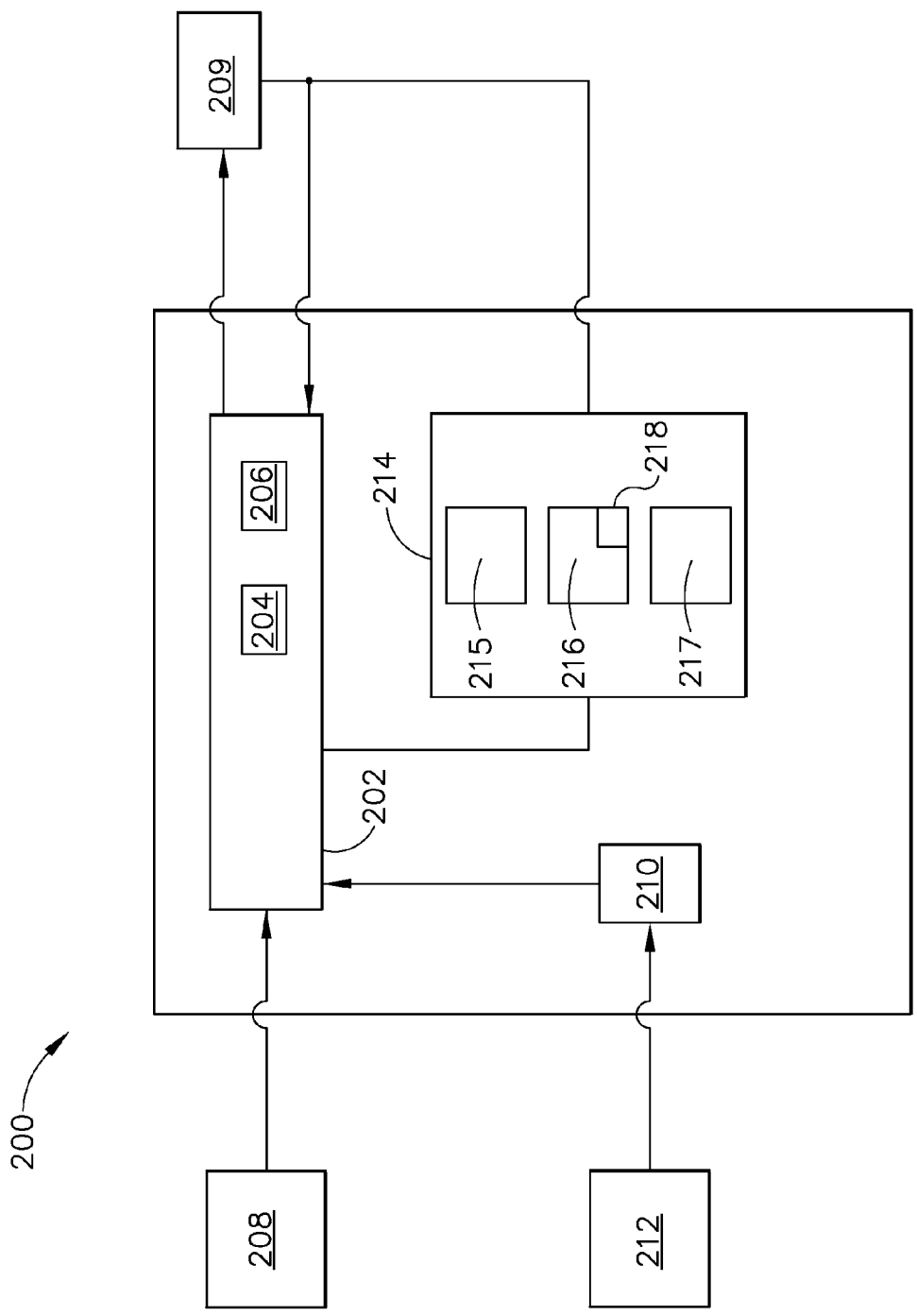

FIG. 2 is a schematic block diagram of a model-based engine control system 200 in accordance with an exemplary embodiment of the present invention. In the exemplary embodiment, engine control system 200 is used to control for example, but not limited to a vehicle propulsion system such as a gas turbine engine power plant for an aircraft. System 200 includes control logic 202 which may include a processor 204 and a memory unit 206. Control logic 202 is communicatively coupled to a command input module 208 configured to receive commands from a plurality of command input sources such as, but not limited to a pilot, an autopilot, a fly-by-wire system, and a remote command system. Control logic 202 is also communicatively coupled to actuators 209 on gas turbine engine assembly 10. Control logic 202 is configured to transmit motion commands to actuators 209 and to receive actuator position information from actuators 209. Control logic 202 is also communicatively coupled to an input signal processing module 210 that is configured to receive sensor values from a plurality of sensors positioned on gas turbine engine assembly 10 and positioned in other locations offboard gas turbine engine assembly 10. Input signal processing module 210 is configured to monitor the operation and output values of sensors 212 and may be programmed to select the combination of sensors 212 that may provide a most accurate representation of the operation on gas turbine engine assembly 10 and the other monitored systems and components. For example, an operating parameter of gas turbine engine assembly 10 may be monitored by a plurality of sensors. If one or more of the plurality of sensors fails or otherwise provides an erratic output or an output that is determined to be inaccurate, input signal processing module 210 can disable the input from the defective sensor and recombine the outputs from the remaining sensors monitoring the operating parameter to provide an input to control logic 202 for that operating parameter that is less accurate because of the reduced number of sensors used to produce the input, but the input is more robust because only the sensors providing accurate outputs are used to generate the input.

An engine model module 214 is used to estimate sensed parameters, such as rotor speeds, temperatures, and pressures, as well as computed parameters such as thrust, airflows, stall margins, and turbine inlet temperature. The computed parameters are based on for example, but not limited to environmental conditions, power setting parameters, and actuator positions input into engine model module 214. In the exemplary embodiment, engine model module 214 comprises a plurality of engine model modules 215, 216, and 217. In the exemplary embodiment, engine model module 215 is a high fidelity thermo/physics propulsion system model with adaptive learning, engine model module 216 is a regression-fit model or Database Estimator (DBE), and engine model module 217 is a simplified physics-based table-based model. The adaptive learning capability of high fidelity thermo/physics engine module 215 includes using actual current measured state information of the propulsion system to fine tune the physics equations of engine model module 215.

One of the plurality of engine model modules may include a singular value decomposition (SVD) module 218. In the description that follows, the SVD module 218 will be described in terms of its application to the regression-fit model 216, but it is to be understood that SVD module 218 could be used with any of the models in engine model module 214. SVD module 218 uses a method to determine, in real-time, if given regression model inputs are "contained" in the regression model training set. If the input suite to the regressor is described by the training data set, there is high confidence in the associated regression model estimate accuracy. In the (offline) design phase of this algorithm, a small set of basis that span the regression model training data is computed via an SVD decomposition of the training data matrix. During real-time implementation, an approximation of the regression model input vector is obtained by projection on to the aforementioned basis set. The approximation error (defined as true minus approximate inputs) is then evaluated and compared against a precomputed threshold. If the error is below threshold, the input vector is said to be contained in the training set and the confidence on the regression model estimate is declared "high." If the error is above threshold, the input vector is said to be outside the training set and the confidence on the regression model estimate is declared "low." Number of basis to be used, as well as threshold values are problem-dependent design parameters of this method.

In various other embodiments, engine model module 215 includes other model types such as a Component Level Model (CLM) and may include a plurality of model modules. Additionally, a model may comprise a hybrid combination of any model types. A type of model is referred to as a Component Level Model (CLM) because each component, for example, inlet 12, ambient air 14, fan assembly 16, core gas turbine engine 17 including HPC 20, combustor 22, and HPT 24, LPT 26 and augmentor 28 within engine model module 215 is individually modeled and then assembled into a specific engine model.

Engine model module 215 is programmed to represent a fast-running transient engine cycle that accounts for flight conditions, control variable inputs, and high-pressure compressor bleed. Further, engine model module 215 includes parameters such as engine component efficiencies and flows which may be adjusted or tuned. These parameters can be modified using a parameter estimation algorithm or tracking filter (TF) 219, thereby modifying the model of a nominal or average engine to the model of a specific engine.

Engine model module 215 is sensitive to flight conditions, control variable inputs, and high-pressure compressor bleed. The quality parameters for engine model module 215 comprise flow and efficiency modifiers for each major rotating component. Such quality parameters may be embodied as constants of a polynomial expression defining each components response to one or more inputs. In the exemplary embodiment, the polynomial constants are derived using test data. Test data is measured during operation which fairly represents the environmental and application requirements of the engine for which the constants are derived. Alternatively, the test data may comprise exhaust temperatures derived from a simulation of gas turbine engine assembly 10.

Figure 3:
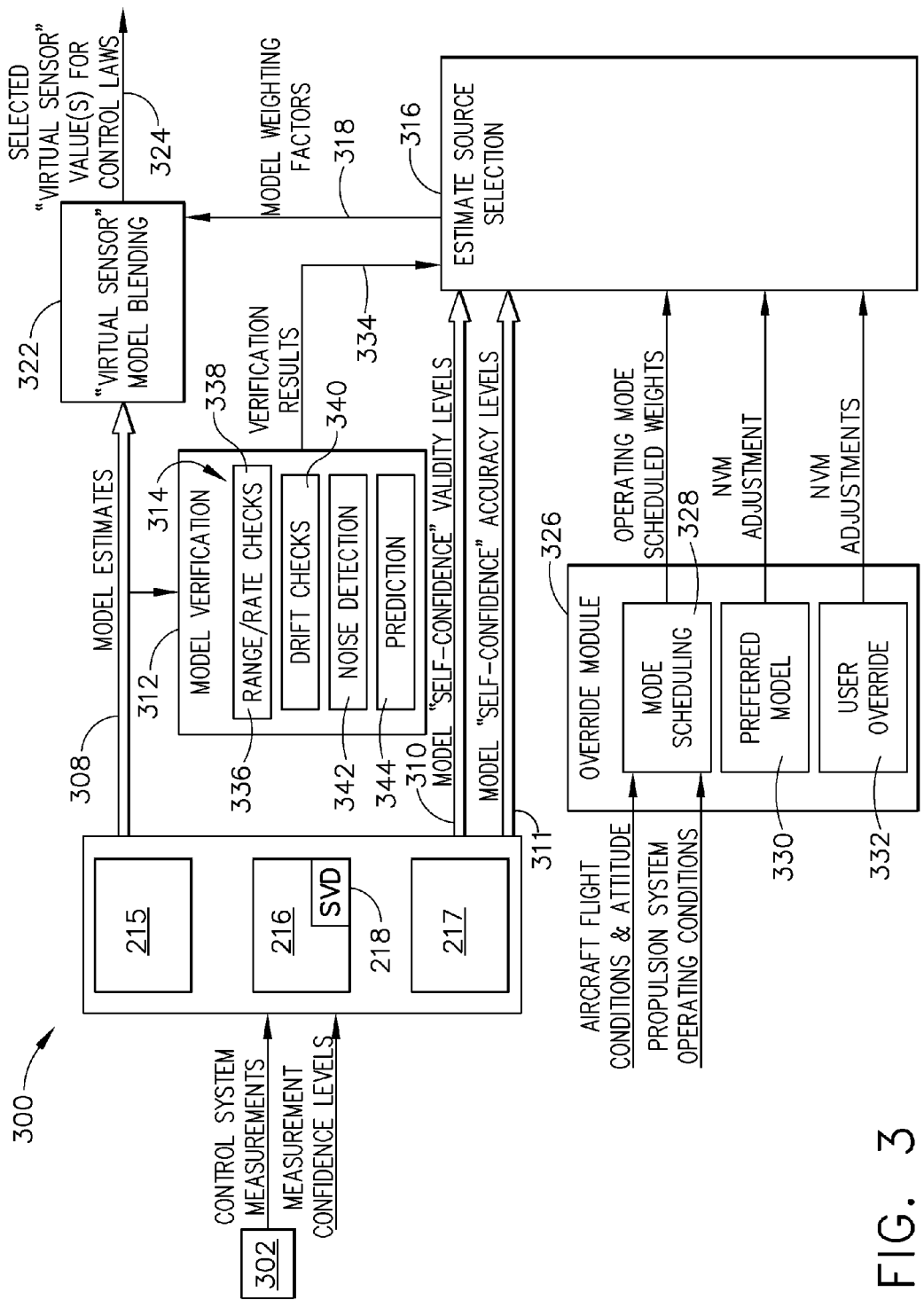

FIG. 3 is a data flow diagram of a model selection and blending architecture 300 that may be used with model-based engine control system 200 (shown in FIG. 2). In the exemplary embodiment, engine control system 200 includes a plurality of engine model modules 215, 216, 217 executing independently on one or more processors 204 and programmed to receive engine operating condition values from a plurality of sensors 302 positioned on gas turbine engine assembly 10. Each of the plurality of sensors 302 may contain at least some of the same sensors as one or more of the other plurality of sensors 302. Each of the plurality of engine model modules 215, 216, 217 is programmed to determine an estimate 308 of a process parameter of a location in the engine where a sensor for the process parameter is not present at the location or a sensor at the location has failed or can not be measured, the plurality of engine model modules 215, 216, 217 are further configured to generate model self-confidence levels 310 indicative of the validity of the determined estimates 308 and to generate model self-confidence levels 311 indicative of the accuracy of the determined estimates 308. The model accuracy level 311 represents a measure of the accuracy of the determined estimate based ability to adapt or tune to current operating conditions and the model validity level 310 represents a measure of the validity of the model based on a predetermined assessment of the inputs to the respective model. It is to be understood that the methods for calculating accuracy and validity may be different for each type of model.

Engine control system 200 includes a model verifier 312 configured to apply one or more reasonableness checks 314 on the determined estimates 308 from each of the engine model modules 215, 216, 217. Model verifier 312 is further configured to generate a verification result 334 for the determined estimates 308 of the process parameter from each of the propulsion system model modules, the verification result represents a measure of a validity of the determined estimates 308 of the process parameter from each of the engine model modules. Model verifier 312 includes at least one of a range check module 336, a rate check module 338, a drift check module 340, a noise detection module 342, and a prediction module 344. An estimate source selector 316 is communicatively coupled to the plurality of engine model modules 215, 216, 217 and model verifier 312, estimate source selector 316 is configured to determine model blending factors 318 using model self-confidence levels 310 and verification results 334 of reasonableness checks 314.

A model blending module 322 is configured to determine an estimated virtual sensor value 324 using determined estimates 308 from at least two of the plurality of engine model modules 215, 216, 217 and model blending factors 318. Model blending module 322 is configured to receive the determined estimates 308 from each of the plurality of engine model modules 215, 216, 217 and to receive model blending factors 318 from estimate source selector 316. A scheduling module 326 is configured to determine at least one of a mode schedule 328, a preferred mode 330, and a user override 332. Scheduling module 326 is configured to determine operating mode schedule weights using at least one of transit conditions, the vehicle attitude, and the operating conditions of the vehicle propulsion system. For example, mode schedule 328 may include information relating to a performance of one of engine model modules 215, 216, or 217 wherein that model is known to not perform well in a particular mode of operation of the engine or propulsion system. For example, it may be known that one of engine model modules 215, 216, or 217 does not perform well when the engine is operating in an after-burner mode. In such a case, mode schedule 328 may indicate using the operating mode schedule weights that one of engine model modules 215, 216, or 217 should not be used or should be weighted lightly when determining the estimate of the engine parameter. The output of mode schedule 328 may be modified to produce a higher weight for the model if for example, another of the engine model modules fails or a sensor providing input to the other model fails. Such would be indicated by validity level 310 and/or accuracy level 311 of the other model being reduced.

Figure 4:
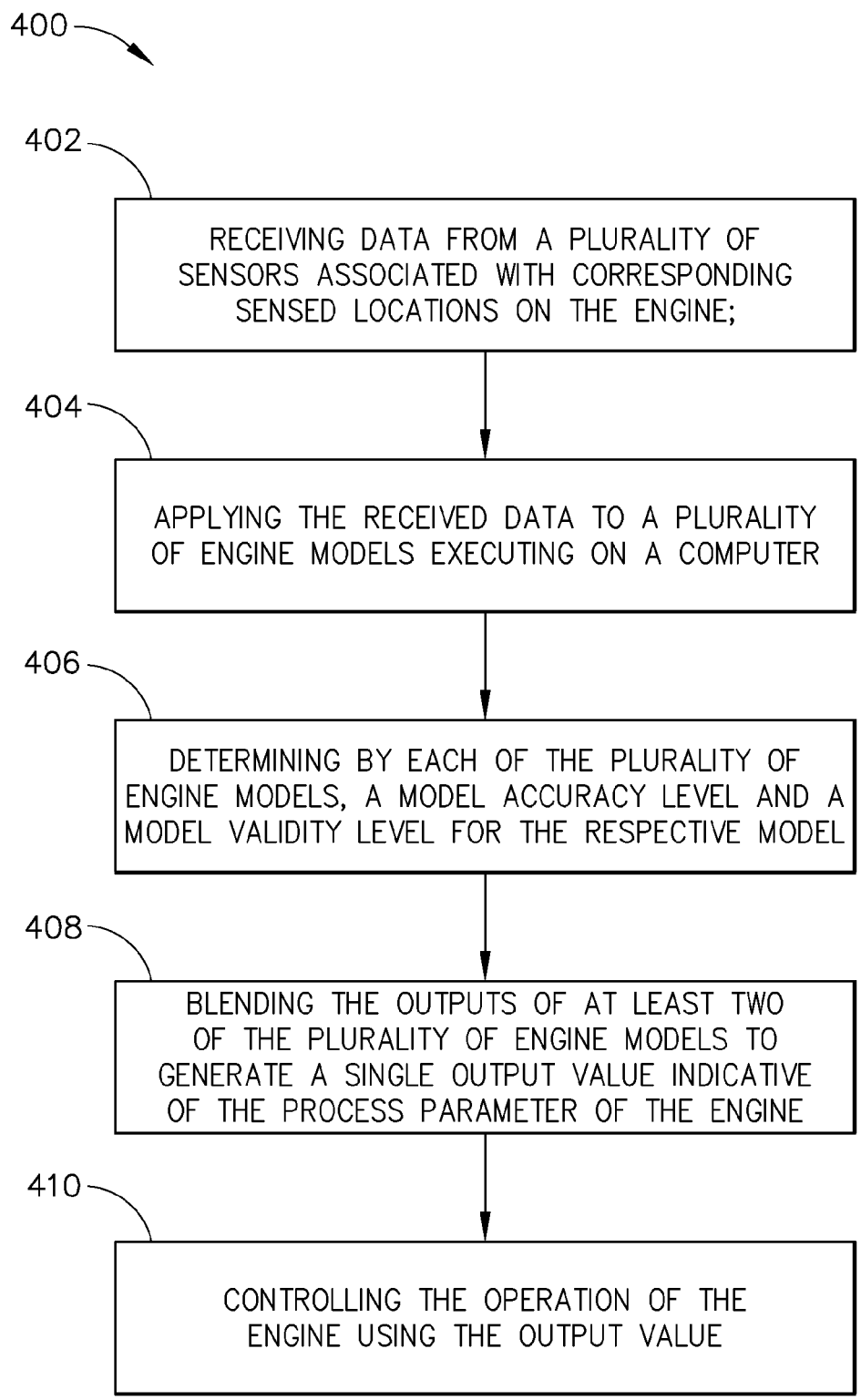

FIG. 4 is a flow diagram of an exemplary method 400 of controlling the operation of an engine of a vehicle. In the exemplary embodiment, the method includes receiving 402 data from a plurality of sensors associated with corresponding sensed locations on the engine, applying 404 the received data to a plurality of engine model modules executing on a computer wherein the plurality of engine model modules are configured to simulate an operation of the engine, and determining by each of the plurality of engine model modules, an estimate of a process parameter of the engine. In one embodiment, method 400 also includes verifying the reasonableness of the estimate of a process parameter of the engine determined by each of the plurality of engine model modules by performing for example, but not limited to a range check, a rate check, a drift check, a noise detection, and a prediction. Method 400 also includes determining 406 by each of the plurality of engine model modules, a model accuracy level 311 and a model validity level 310 for the respective mode wherein the model accuracy level represents a measure of the accuracy of the determined estimate based on a predetermined assessment of the inputs to the respective model and wherein the model validity level 310 represents a measure of the validity of the model based on a predetermined assessment of the inputs to the respective model. In one embodiment, determining 406 a model accuracy level 311 and a model validity level 310 includes performing a singular value decomposition (SVD) process. Method 400 further includes blending 408 the outputs of at least two of the plurality of engine model modules to generate a single output value indicative of the process parameter of the engine using model blending factors generated by an estimate source selector, and controlling 410 the operation of the engine using the output value. In various other embodiments, method 400 includes generating an override level using at least one of a transit condition of the vehicle, an attitude of the vehicle, an operating condition of the engine, a preferred model selection, and a manual override. In another embodiment, method 400 includes generating an estimate source selection input using at least one of a verified reasonableness of the estimate, a model accuracy level, a model validity level, and an override level.

Figure 5:
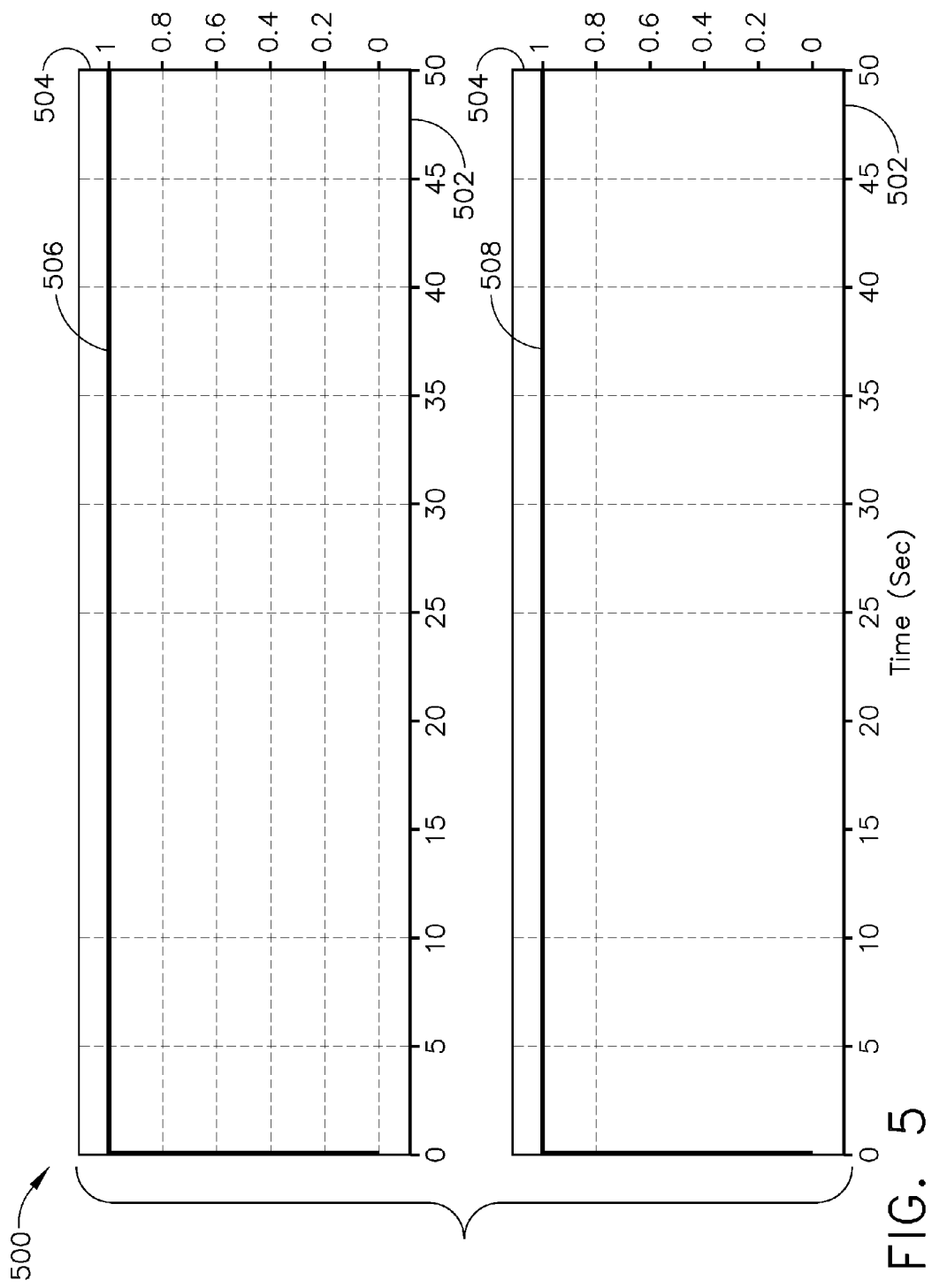

FIG. 5 is a graph 500 of the validity level of engine model module 215 and 216 in accordance with an exemplary embodiment of the present invention. In the exemplary embodiment, graph 500 includes an x-axis 502 graduated in units of time and a y-axis 504 for the validity level of each of engine model modules 215 and 216 graduated in units of confidence level expressed as a level between zero for no confidence and one for high confidence. Graph 500 includes a trace 506 of the self-assessed validity of engine model module 215 and a trace 508 of the self-assessed validity of engine model module 216. The signals represented by traces 506 and 508 are transmitted from the respective engine model modules to estimate source selector 316 via model self-confidence levels 310.

Figure 6:
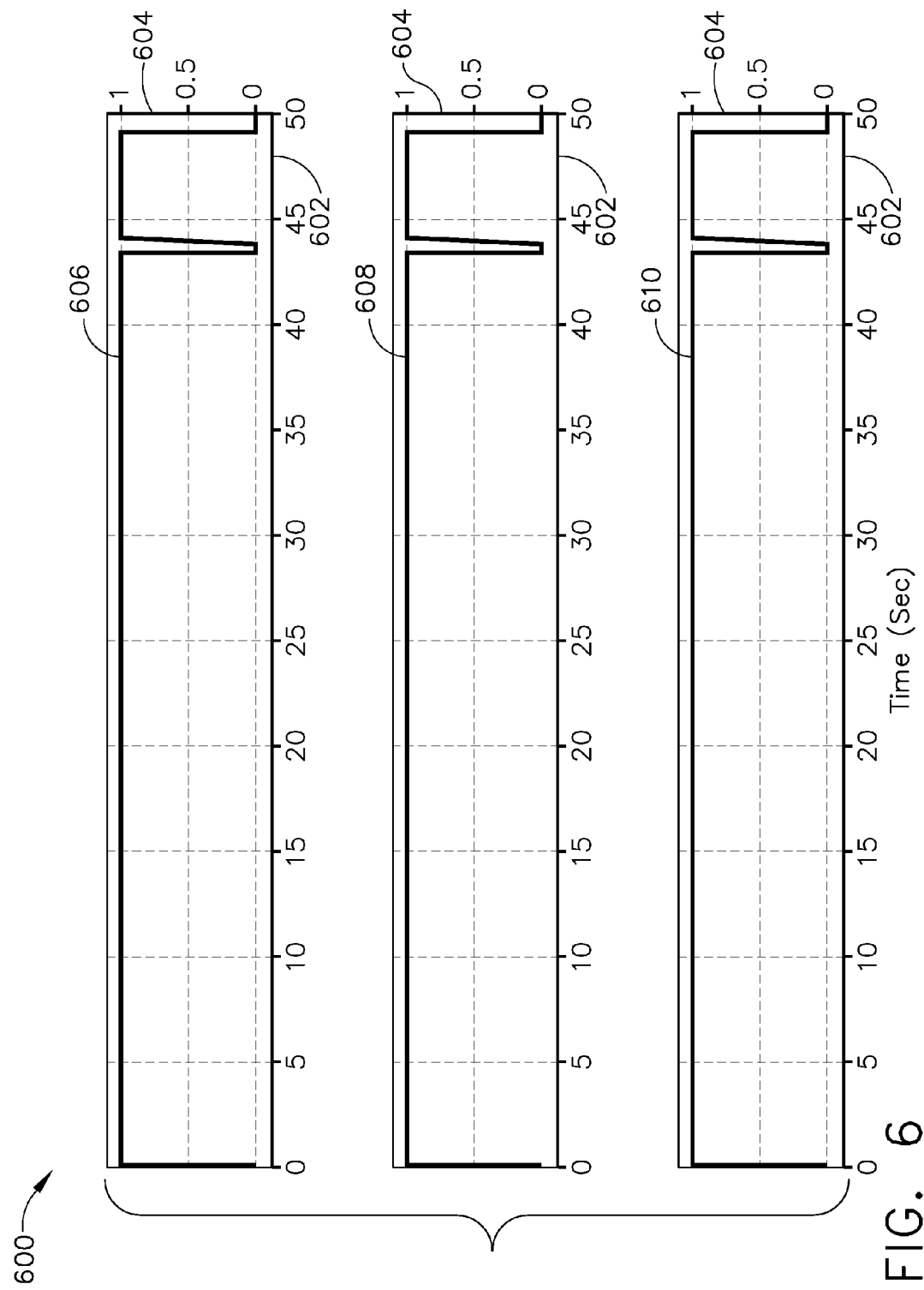

FIG. 6 is a graph 600 of the mode scheduling of engine model modules 215, 216, and 217 in accordance with an exemplary embodiment of the present invention. In the exemplary embodiment, graph 600 includes an x-axis 602 graduated in units of time and a y-axis 604 for the validity level of each of engine model modules 215, 216, and 217 graduated in units of confidence level expressed as a level between zero for no confidence and one for high confidence. Graph 600 includes a trace 606 of the mode schedule of engine model module 215, a trace 608 of the mode schedule of engine model module 216, and a trace 610 of the mode schedule of engine model module 217. The signals represented by traces 606, 608, and 610 are transmitted from the respective engine model modules to estimate source selector 316 as operating mode scheduled weights.

Figure 7:
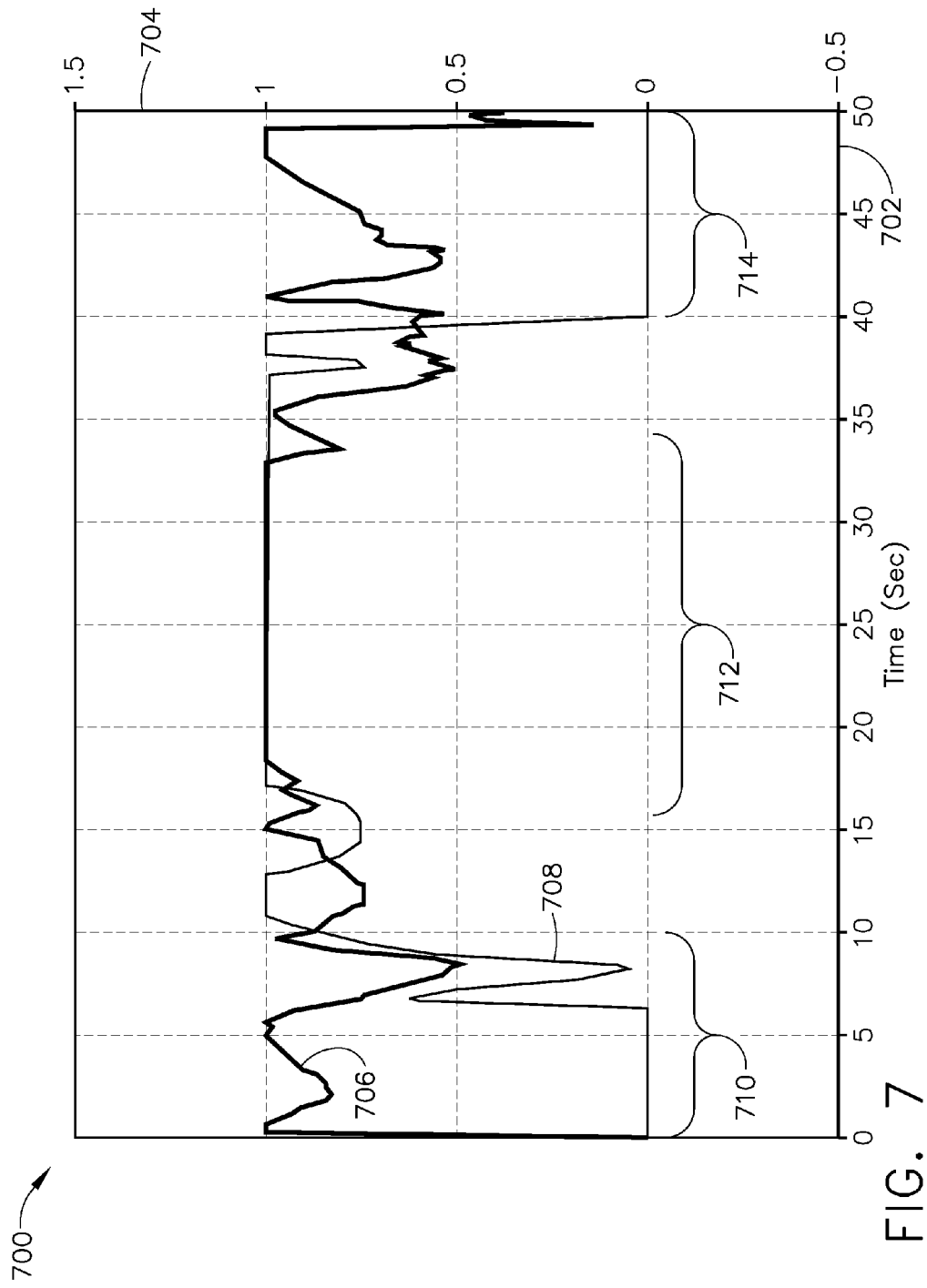

FIG. 7 is a graph 700 of the model accuracy self-confidence of engine model modules 215 and 216 in accordance with an exemplary embodiment of the present invention. In the exemplary embodiment, graph 700 includes an x-axis 702 graduated in units of time and a y-axis 704 for the accuracy level of each of engine model modules 215 and 216 graduated in units of accuracy level expressed as a level between zero for no accuracy confidence and one for high accuracy confidence. Graph 700 includes a trace 706 of the accuracy level of engine model module 215 and a trace 708 of the accuracy level of engine model module 216. The signals represented by traces 706 and 708 are transmitted from the respective engine model modules 215 and 216 to estimate source selector 316 via model self-confidence levels 310. Engine model module 215 determined that it is more accurate at a beginning part of the transient 710. During a middle part of the transient 712, engine model modules 215 and 216 both determine that they are accurate, and towards the end part of the transient 714 engine model module 215 again determines it is more accurate. Additionally, there is no confidence in the accuracy level of engine model module 216 at beginning part of the transient 710 and end part of the transient 714.

Figure 8:
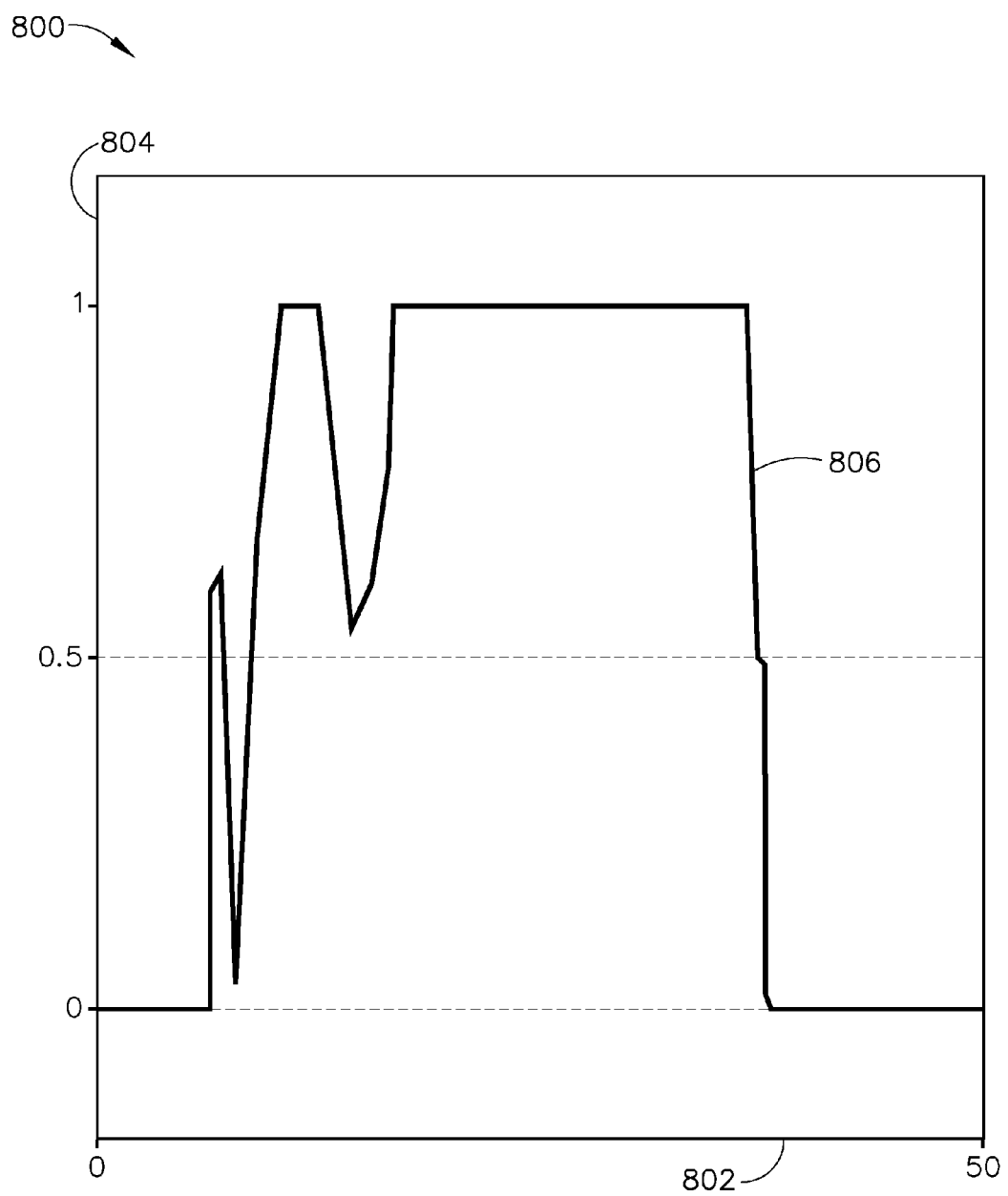

FIG. 8 is a graph 800 of a trace of a confidence level of a regression model within engine model module 216 in accordance with an exemplary embodiment of the present invention. In the exemplary embodiment, graph 800 includes an x-axis 802 graduated in units of time and a y-axis 804 for the accuracy level of each of engine model modules 215 and 216 graduated in units of accuracy level expressed as a level between zero for no accuracy confidence and one for high accuracy confidence. Graph 800 includes a trace 806 of the accuracy level of engine model module 215. Because engine model module 216 uses single value decomposition (SVD) analysis in conjunction with the regression models, a plurality of single value decomposition confidence indices are generated. The single value decomposition confidence indices provide an indication of how well the current data being analyzed by the model correlates to the training data set. A confidence level value of approximately one indicates that the model has determined is it operating within or near the training bounds of the training data. A confidence level of approximately zero indicates that the model has determined is it operating outside the training bounds of the training data and therefore the model is valid, but the accuracy level may be compromised.

Each model within engine model module 216 determines its own confidence index and the confidence indices are combined into a composition index for engine model module 216, which is output to estimate source selector 316. The confidence indices may be combined using for example, but not limited to a weighted average of some or all of the confidence indices.

Figure 9A:
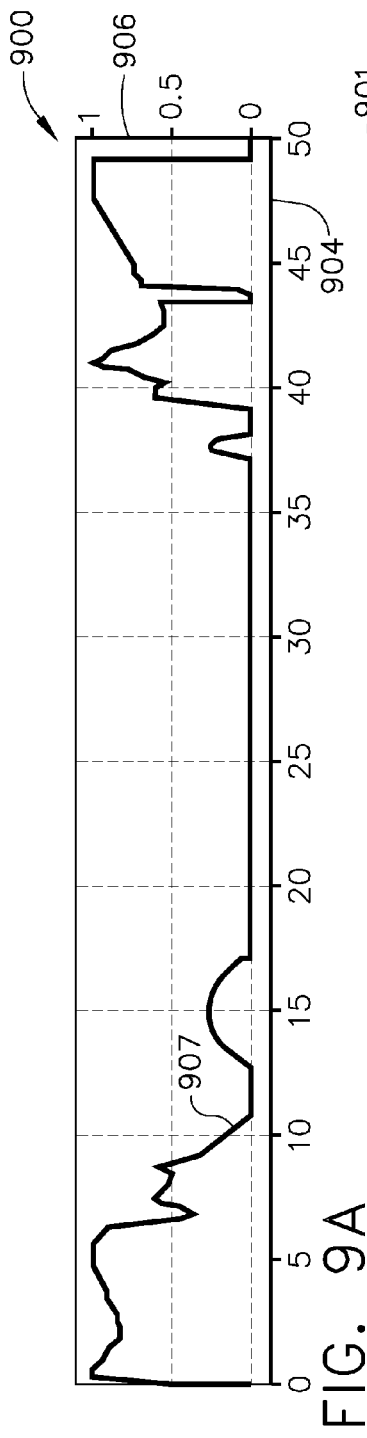
FIGS. 9A, B, and C are each a graph of model weighting factors generated by the estimate source selector shown in FIG. 3 and transmitted to the model blending module shown in FIG. 3.
Figure 9B:
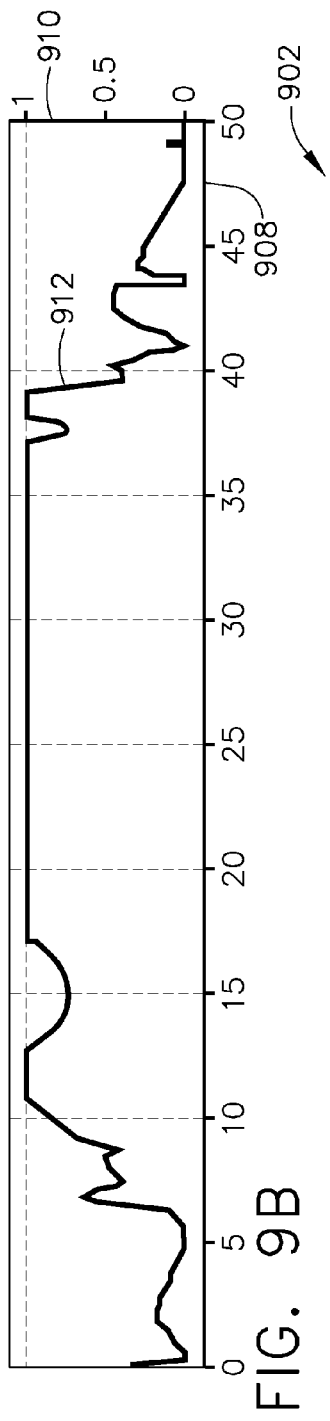
Figure 9C:
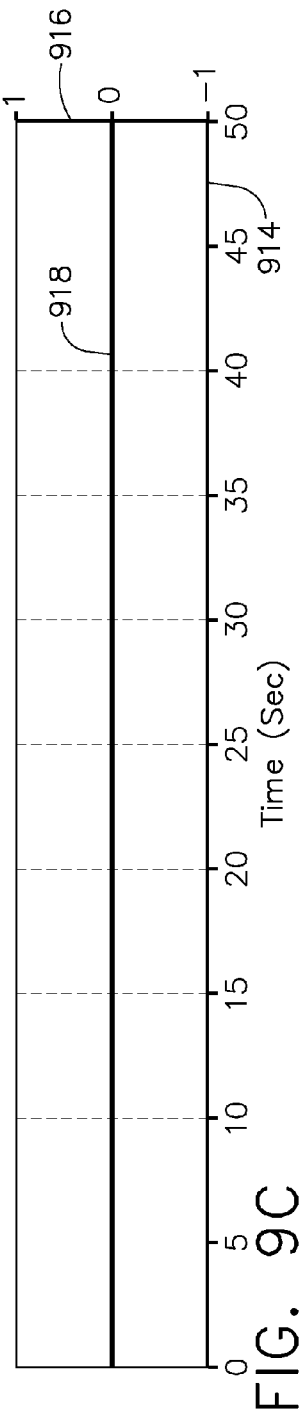

FIGS. 9A, B, and C are each a graph 900, 901, and 902, respectively, of model weighting factors generated by estimate source selector 316 (shown in FIG. 3) and transmitted to model blending module 322 (shown in FIG. 3). In the exemplary embodiment, graph 900 includes an x-axis 904 graduated in units of time and a y-axis 906 graduated in units of model weight as a level between zero for no weight and one for total weight. Graph 900 includes a trace 907 of the weight assigned to the parameter estimate determined by engine model module 215 (shown in FIG. 3). Graph 901 includes an x-axis 908 graduated in units of time and a y-axis 910 graduated in units of model weight as a level between zero for no weight and one for total weight. Graph 901 includes a trace 912 of the weight assigned to the parameter estimate determined by engine model module 216 (shown in FIG. 3). Graph 902 includes an x-axis 914 graduated in units of time and a y-axis 916 graduated in units of model weight as a level between zero for no weight and one for total weight. Graph 902 includes a trace 918 of the weight assigned to the parameter estimate determined by engine model module 217 (shown in FIG. 3).

During operation, the model weighting factors are transmitted to model blending module 322 along with corresponding parameter estimates from engine model modules 215, 216, and 217. Model blending module 322 combines the parameter estimates into a single parameter output using the model weighting factors to determine an amount of the estimate from each model to be incorporated into the single parameter output.

As will be appreciated by those of ordinary skill in the art, though physics-based and regression-based models are discussed herein for the purpose of illustration, other modeling approaches may also be suitable for use in accordance with the present techniques.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory 206 for execution by processor 204. Memory 206 can be implemented using any appropriate combination of alterable, volatile, or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, and/or flash memory. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and/or disk drive. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is using a computer model to calculate an operating parameter of interest for example, thrust or temperature downstream of the combustor based on other measured variables already available to the control system. These measured variables include actuator positions, rotor speeds, gas-path pressures, and temperature measurements for example, upstream of the combustor. The models can be regression-based or physics-based. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems of controlling operating parameters such as, but not limited to temperature in a machine, for example, but not limited to a gas turbine engine provides a cost-effective and reliable means determining virtual sensor outputs based on actual sensor outputs and a computer-based model of the machine. More specifically, the method and systems described herein facilitate managing a redundancy of the sensors used to determine the operating parameters. In addition, the above-described method and systems facilitate outputting actuator control signals to affect changes in the operation of the machine to maintain operating parameters within allowed limits and/or return operating parameters into allowed limits. As a result, the method and systems described herein facilitate controlling the operation of a machine in a cost-effective and reliable manner.

An exemplary method and systems for automatically and continuously determining the operating parameters of a machine in areas of the machine that are not directly monitored by sensors are described above in detail. The systems illustrated are not limited to the specific embodiments described herein, but rather, components of each may be utilized independently and separately from other components described herein. Each system component can also be used in combination with other system components.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine control system for a vehicle propulsion system comprising:
   a processor;
   a plurality of engine model modules executing independently and programmed to receive engine operating condition values from a plurality of sensors positioned on an engine, each of said plurality of engine model modules programmed to determine an estimate of a process parameter of a location in the engine where at least one of a sensor for the process parameter is not available, a sensor for the process parameter is not present at the location, a sensor at the location has failed, and a sensor at the location is determined to be inaccurate;
   an estimate source selector configured to determine model blending factors; and
   a model blending module configured to determine an estimated virtual sensor value using the determined estimates from at least two of the plurality of engine model modules and the model blending factors.

2. An engine control system in accordance with claim 1, wherein said plurality of engine model modules comprises at least one of a physics model, a regression model, a look-up table model, and a combination thereof.

3. An engine control system in accordance with claim 1, wherein said model blending factors are calculated using at least one of a model self-confidence level generator, a model verifier, and a scheduling module.

4. An engine control system in accordance with claim 3, wherein when at least a model self-confidence level generator is used to calculate said model blending factors, said model self-confidence level generator is configured to generate estimates indicative of the accuracy and validity of the determined model estimates.

5. An engine control system in accordance with claim 4 wherein said model self-confidence level generator is configured to generate estimates indicative of the accuracy of the determined model estimate using at least one of an analysis of singular value decomposition results and parameter estimation residuals.

6. An engine control system accordance with claim 4 wherein said model self-confidence level generator is configured to generate estimates indicative of the validity of the determined model estimates using at least one of an model input validity check and an internally calculated parameter validity check.

7. An engine control system in accordance with claim 3 wherein when at least a model verifier is used to calculate said model blending factors, said model verifier comprises at least one of a range check module, a rate check module, a drift check module, a noise detection module, and a prediction module.

8. An engine control system in accordance with claim 3, wherein when at least a model verifier is used to calculate said model blending factors, said model verifier is configured to impose reasonableness checks on the determined process parameter estimates from each of the engine model modules.

9. An engine control system in accordance with claim 3, wherein when at least a scheduling module is used to calculate said model blending factors, said scheduling module is configured to accept user inputs or predetermined operating mode schedules.

10. An engine control system in accordance with claim 3, wherein when at least a scheduling module is used to calculate said model blending factors, said scheduling module is configured to determine at least one of an operating mode schedule, a preferred user mode, and a user override.

11. A method of controlling the operation of an engine of a vehicle, said method comprising:
    receiving data from a plurality of sensors associated with corresponding sensed locations on the engine;
    determining by each of a plurality of engine model modules configured to simulate an operation of the engine, an estimate of a process parameter of a location in the engine where at least one of a sensor for the process parameter is not available, a sensor for the process parameter is not present at the location, a sensor at the location has failed, and a sensor at the location is determined to be inaccurate;
    determining model blending factors using an estimate source selector;
    determining an estimated virtual sensor value using the determined estimates from at least two of the plurality of engine model modules and the model blending factors; and
    controlling the operation of the engine using the estimated virtual sensor value.

12. A method in accordance with claim 11, wherein determining by each of a plurality of engine model modules comprises determining by each of a plurality of engine model modules comprising at least one of a physics model, a regression model, a look-up table model, and a combination thereof.

13. A method in accordance with claim 11, wherein determining model blending factors comprises calculating the model blending factors using at least one of a model self-confidence level generator, a model verifier, and a scheduling module.

14. A method in accordance with claim 13, wherein when calculating the model blending factors using at least a model self-confidence generator, calculating the model blending factors comprises generating estimates indicative of the accuracy and validity of the determined model estimates.

15. A method in accordance with claim 14 wherein generating estimates indicative of the accuracy of the determined model estimates comprises generating estimates indicative of the accuracy of the determined model estimates using at least one of an analysis of singular value decomposition results and parameter estimation residuals.

16. A method accordance with claim 14 wherein generating estimates indicative of the validity of the determined model estimates comprises generating estimates indicative of the validity of the determined model estimates using at least one of an model input validity check and an internally calculated parameter validity check.

17. A method in accordance with claim 13 wherein when calculating the model blending factors using at least a model verifier, calculating the model blending factors comprises calculating the model blending factors using at least one of a range check module, a rate check module, a drift check module, a noise detection module, and a prediction module.

18. A system for controlling the operation of a vehicle engine comprising:
    a plurality of sensors configured to output a sensed vehicle parameter value; and an engine controller comprising:

a plurality of engine model modules comprising at least one of a physics model, a regression model, and a look-up table model, said plurality of engine model modules executing independently and programmed to receive engine operating condition values from the plurality of sensors, each of said plurality of engine model modules programmed to determine an estimate of a process parameter of a location in the engine where at least one of a sensor for the process parameter is not present at the location and a sensor at the location has failed, said plurality of engine model modules further configured to generate at least one of a model accuracy level and a model validity level, said model accuracy level represents a measure of the accuracy of the determined estimate based on a predetermined assessment of the inputs to the respective model, said model validity level represents a measure of the validity of the model based on a predetermined assessment of the inputs to the respective model;

a model verifier configured to apply at least one of a range check, a rate check, a drift check, a noise detection, and a prediction on the determined estimates from each of the engine model modules to generate a verification result for the determined estimates of the process parameter from each of the engine model modules, the verification result represents a measure of a validity of the determined estimates of the process parameter from each of the engine model modules;

an estimate source selector communicatively coupled to said plurality of engine model modules and said model verifier, said estimate source selector configured to determine model blending factors using the model self-confidence levels and results of the reasonableness checks; and a model blending module configured to determine an estimated virtual sensor value using the determined estimates from at least two of the plurality of engine model modules and the model blending factors.

19. An engine controller system in accordance with claim 18 further comprising an scheduling module configured to determine operating mode schedule weights using at least one of transit conditions, vehicle attitude, and operating conditions of the vehicle propulsion system.

20. An engine controller system in accordance with claim 18 wherein at least one of said plurality of engine model modules comprises a singular value decomposition (SVD) module programmed to determine, in real-time, if given regressor inputs are contained in a training set of the regression model.

* * * * *